United States Patent

Forch

[11] 3,938,813
[45] Feb. 17, 1976

[54] POSITIVE-CONTACT SEAL
[75] Inventor: Hans Forch, Birkenau, Germany
[73] Assignee: Firma Carl Freudenberg, Weinheim an der Bergstrasse, Germany
[22] Filed: Aug. 1, 1974
[21] Appl. No.: 493,937

[30] Foreign Application Priority Data
Aug. 3, 1973 Germany............................ 2339353

[52] U.S. Cl................................. 277/152; 277/134
[51] Int. Cl.² ......................................... F16J 15/32
[58] Field of Search ............ 277/152, 134, 164, 165

[56] References Cited
UNITED STATES PATENTS

| | | | |
|---|---|---|---|
| 2,804,325 | 8/1957 | Riesing | 277/134 |
| 2,932,535 | 4/1960 | Reickii | 277/152 |
| 3,545,770 | 12/1970 | Wheelock | 277/152 |
| 3,801,114 | 4/1974 | Bentley | 277/134 |
| 3,825,271 | 7/1974 | Bellastio | 277/152 |

Primary Examiner—Robert I. Smith
Attorney, Agent, or Firm—Burgess, Dinklage & Sprung

[57] ABSTRACT

An improvement in a sealing assembly for a shaft which sealing assembly has a housing for a fluid medium, a flexible sealing ring disposed within said housing and adapted to be disposed about said shaft in contact therewith and means for urging said flexible sealing ring disposed within said housing and adapted to be disposed about said shaft in contact therewith and means for urging said flexible sealing ring into contact with said shaft. The improvement resides in that the flexible sealing ring comprises a layer which is impermeable to said fluid medium, said layer disposed in facing relationship to the interior of said housing, said sealing ring having on its exterior surface which is to be in contact with the shaft free fiber ends, a majority of which are oriented in an axial direction towards the interior of said housing and are disposed in the direction of rotation of the shaft.

24 Claims, 10 Drawing Figures

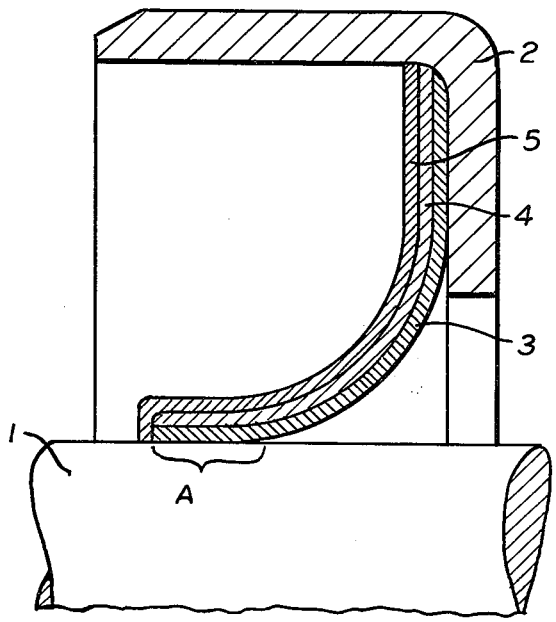
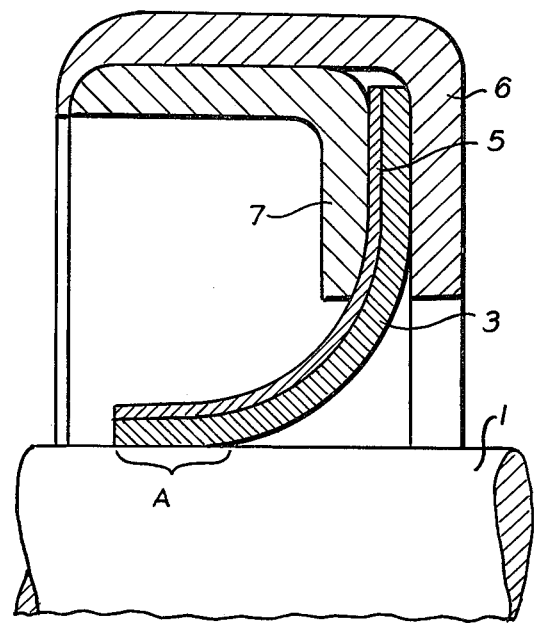
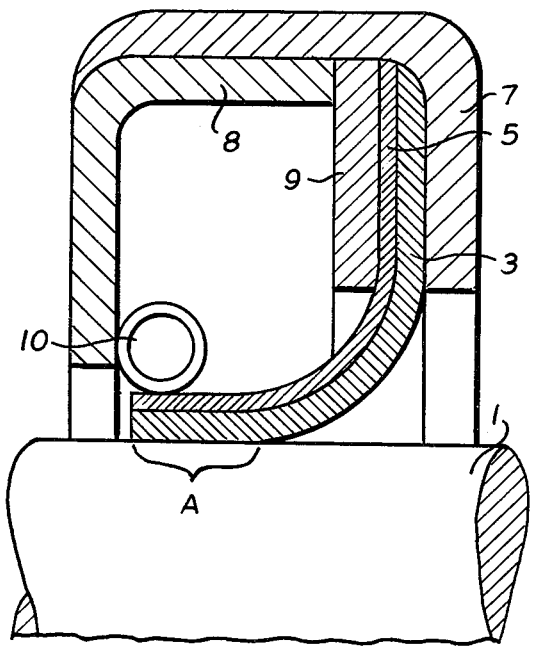
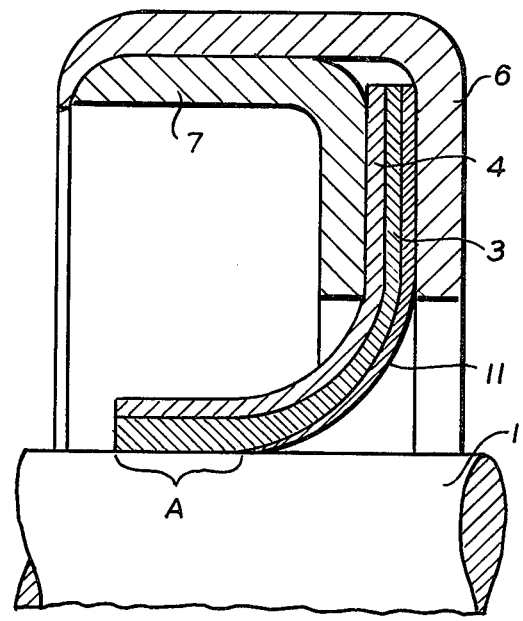

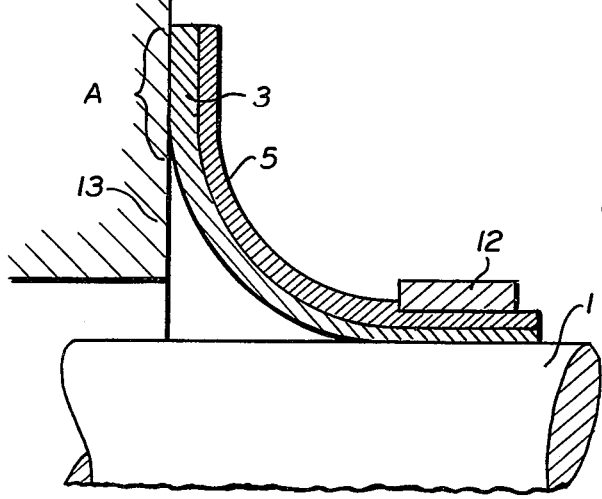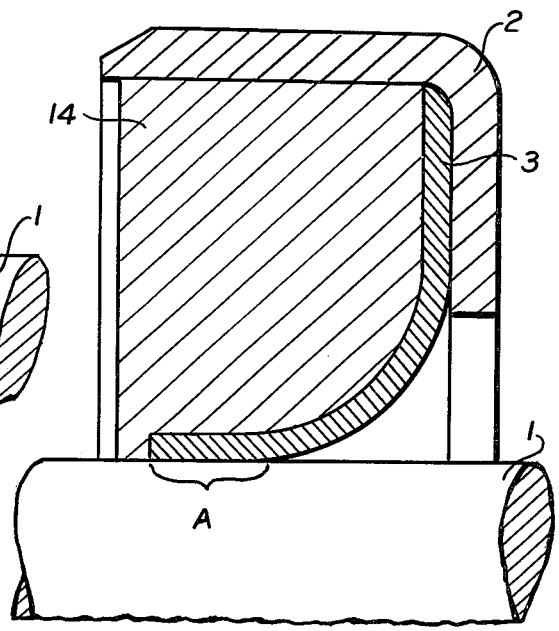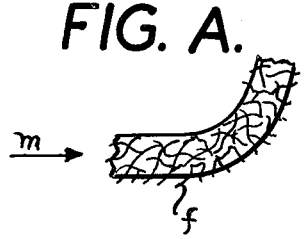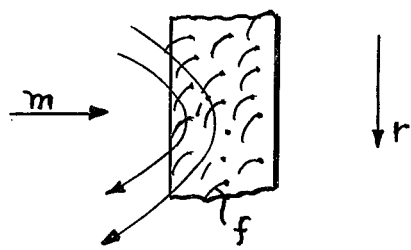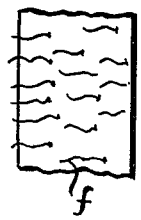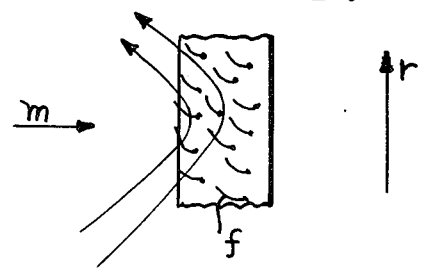

POSITIVE-CONTACT SEAL

BACKGROUND OF THE INVENTION

1. Field of the Invention

This invention relates to a sealing assembly to be disposed about shafts which are operated at high speed and generate considerable frictional heat. More particularly, this invention is directed to an assembly to be disposed about a rotatable shaft which assembly contains a fluid medium such as an oil wherein there is provided a flexible sealing ring adaptable to be disposed against the shaft and to be in contact with the contained fluid medium which flexible sealing ring has on the surface to be in contact with the fluid medium and, thus, the surface facing the interior of the housing a layer which is impermeable to the fluid medium. The flexible sealing ring has on its opposite surface, the surface in engagement with the shaft, free fiber like ends which are adaptable to be disposed a majority of which fiber like ends are adaptable to be disposed in an axial direction towards the interior of the housing and to be disposed in the direction of rotation of the shaft. This invention is particularly directed to positive-contact seals of the radial or axial lip seal type having a self-adjusting helix.

2. Discussion of the Prior Art

The use of sealing seals has long been known. For instance, it has been known to utilize felt rings or leather shaft seals which are disposed about a shaft and can help in containing a fluid medium. This technology has given way in recent years to the use of elastomeric shaft sheilds. These seals are useful in low rotation speed operations. Particularly, felt and leather seals can be employed where the rotational speed of the shaft is low and only moderate heats of friction are generated. However, the application of these kinds of materials is limited by the rate of revolution of the shaft and by the temperature thusly generated.

For the higher rates of speed, shaft seals of elastomers have proven to be of value. These have a generally better sealing capacity. For this purpose it is necessary that the sealing edge be operated exactly in the range between dry operation and full hydrodynamic lubrication. Strict consideration must be given to the frictional heat which is generated during the rotation of the shaft if one is to preserve the lubricant so that it functions and thus to insure that the sealing material is present during the desired lifetime. With the rise in temperature during such high speed operations the range of application of the elastomeric sealing rings becomes limited. The use of such elastomeric sealing rings is thus quite dependent upon the temperature of the medium.

As all elastomers are not fully suited for dry operation by design, a well lubricated sealing edge which is as narrow as possible is often provided. In order to achieve a perfect sealing, a minimum contact pressure (pre-stressing) of the lip seal is necessary. The frictional heat which is generated causes a high rise in temperature at the narrow contact surface. This means that great precision is required to avoid leakage of the medium. High requirements must be observed if even minimum defects resulting in leakage are to be avoided as a result of the high rise in temperature at the narrow contact surface.

Attempts have been made to produce a sealing lip of a material having a low coefficient of friction. For instance, it has been proposed to utilize polytetrafluoroethylene as a sealing lip material. Such attempts have improved the principal difficulties encountered owing to the development of heat of friction, but they have introduced the disadvantages such as in poor dynamic sealing properties and high wear characteristics which ultimately lead to an early breakdown of the sealing ring. Additionally, the sealing improvement initially obtained as a result of the low coefficient of friction of the polytetrafluoroethylene is observed only in particular cases under particular conditions.

In the case of fast rotating shafts where extreme requirements must be met these sealing lips of polytetrafluoroethylene have not fully met the requirements.

There have already been developed, in respect of high speed rotational shafts improvements in order to wind back leaking oil. For instance, there has been applied to the traditional sealing lips of elastomeric material an additional helix. To wind back leaking oil on the sealing surface, helical ribs and grooves have been molded or ground. The operation of this helix can be compared to the operation of a wind back thread, i.e., the lubricant, e.g., the medium to be sealed, is prevented from leaking through to the atmosphere between the rotating shaft and the sealing lip by means of the action of the helix.

Seals made of elastomers are known and described in, for example, German Offenlegungsschrift 1,916,214. Here a seal is described which achieves the winding back of the sealed medium by supplying the sealing lips with mobile axial extensions which deform according to the direction or torsion due to the frictional movement created by the revolution of the shaft. According to the motion of the shaft, these edges become inclined and wipe off the oil or other medium from the shaft. As these wiping edges are arranged towards the oil side, these and similar embodiments have the disadvantage in that by wiping too well, too little oil reaches the sealing edge. On the other hand, if the wiping effect is too small, the sealing lip again has, as in the traditional radial shaft seal, to take over the sealing effect.

It, therefore, has become desirable to provide a flexible sealing ring which can be employed about a shaft which can be rotated at high speeds as well as at slow speeds and can be employed independent of the extent of frictional heat generated by rotation of the shaft. More particularly, it has become desirable to provide a shaft seal which does not permit excessive oil to diffuse through the point of contact. On the other hand, it has also become desirable to provide such a shaft seal which does not restrain too much oil so that the shaft is disposed against the proper amount of fluid medium at the point it which engages the flexible sealing ring.

SUMMARY OF THE INVENTION

The objects above outlined are met by an improved sealing assembly for a shaft which sealing assembly comprises a housing for a fluid medium, a flexible sealing ring disposed within said housing and adaptable to be disposed about said shaft in contact therewith and means for urging said flexible sealing ring into contact with said shaft. The improved sealing assembly is characterized in that the flexible sealing ring comprises a layer which is impermeable to the fluid medium to be used, said layer is disposed in facing relationship to the interior of said housing, said ring has on its exterior surface which is to be in contact with the shaft free fiber ends. A majority of the free fiber ends are oriented in an axial direction towards the interior of the housing and are disposed in the direction of rotation of the shaft.

By utilizing a particular type of flexible sealing ring, preferably made of a non-woven fabric, the disadvantages attendant prior art seals are not encountered. The seal assembly has a self-adjusting helix which assures a perfect sealing effect even under extreme conditions.

At the heart of the present invention there is the use of a particular material having free fiber ends. A preponderant majority of the free fiber ends are oriented in axial direction towards the medium to be sealed, e.g., the fluid medium. The free fiber ends are also oriented to follow the shaft in the direction of rotation.

Generally speaking, numerous woven and non-woven materials can be employed for this purpose. Generally speaking, a multiplicity of free ends is rising from the surface of flexible sealing ring so that there is assured that a significant number of the free fiber ends are axially oriented in the direction of the fluid medium to be sealed, i.e., in the direction of the interior of the sealing assembly housing.

It is absolutely necessary that at least the fiber end of the flexible sealing ring with come in contact with the rotating shaft are mobile. The fiber ends must have the necessary restorative force in order to form during movement an angle with the direction of the periphery which angle is other than 0. Non-woven fabrics have been found to especially suited where they are sealed on the side to be in contact with the fluid medium. Such sealing can be accomplished by impregnating a composition on that side or by coating the fabric with a material which is not removed or otherwise affected by the fluid medium. Numerous different fibers of varying staple length can be employed as the fibers of the fabric having the fiber free ends. Especially desirable are synthetic fibers such as polyesters and polyamides, notably nylon fibers. However, numerous other fibers, particularly fibers of cellulosic fibers such as cellulose acetate, cellulose acetate butyrate, acrylics such as fibers of polymethylmethacrylate, polyethylmethacrylate, copolymeric systems such as polymers of acrylonitrile-butadiene-sytrene, fibers of polycarbonates, polystyrene, other vinyl polymers and copolymers, polyurethanes and the like. The selection of the composition of the fiber will depend upon the particular application of the sealing and, the speed at which the shaft is to be rotated and the extent of frictional heat to be generated. Especially desirable are fibers which have a high crystalline component. These are desirable because of their high restorative ability.

In order to achieve the desired orientation of the fiber ends in the axial direction, it is normally not possible to take advantage of the privileged direction of a non-woven or woven fabric as the seal must be cut in the form of a ring. Therefore, it is necessary to orient the fiber material by means of a subsequent surface treatment so that the fiber material is disposed in the proper direction. Thus, the free fiber ends must be mobile in the sense that they must be mobile by action of the rotating shaft. A sufficient orientation, however, can already be obtained in many cases by allowing an original non-oriented, plain material to abut taperingly the contact counterpart of the shaft so that a different contact pressure results. This decreases from the edge of the sealing surface facing the medium towards the side disposed away from the medium and which side is to be in contact with the shaft.

BRIEF DESCRIPTION OF DRAWINGS

The invention can be more readily understood and appreciated when reference is made to the accompanying drawings in which;

FIG. I is a side elevation of a shaft, the sealing assembly thereabout disposed being in section;

FIG. II is a view similar to FIG. I showing another embodiment of the invention;

FIG. III is another view similar to FIGS. I and II showing still another embodiment of the invention;

FIG. IV is a view similar to FIGS. I–III showing a fourth embodiment of the invention;

FIG. V is a view similar to FIGS. I–IV showing a fifth embodiment of the invention;

FIG. VI is a view similar to FIGS. 1–V showing a sixth embodiment of the invention wherein a foam is employed;

FIG. A is a side representative view of a portion of the sealing ring material showing loose fiber ends;

FIG. B is a plan view of the fabric of FIG. A;

FIG. C is a plan view similar to FIG. B showing the orientation of the fibers f in an axial direction towards the medium and interior of the casing or housing of the sealing assembly; and FIG. D is a view similar to FIG. C showing the reverse orientation of the fibers f.

DESCRIPTION OF SPECIFIC EMBODIMENTS

Referring to FIGS. A–D there is shown a preferred arrangement of the free fiber ends in an apparatus embodying a self-adjusting helix. In FIG. A, the front portion of the sealing surface, i.e., the contact surface is shown in section. It will be seen that a predominating majority of the freely mobile fiber ends become oriented in the direction of the medium which is to be sealed. See FIGS. C and D. FIG. B shows the contact surface before orientation has been given to the fibers f, i.e., before the commencement of the sealing process. FIGS. C and D show the disposition of the free fiber ends which have become adjusted in relation to the direction of rotation r of the rotation of the machine embodying the sealing apparatus. Through the deflection of the free fiber ends f, a helix adjusts automatically which restores the material to be sealed.

In the use of the fabric shown in FIGS. A–D optimal properties can be provided by suitably loosening the fiber structure itself by removing a portion of the fibers from the surface which engages the shaft, i.e., the mating surface. In the sealing ring of the invention, the helix adjusts automatcially to correspond to the direction of rotation of the shaft.

By this construction, one can regulate the extent to which the non-woven fabric sealing ring is in contact with the rotating shaft. For instance, the contact can be made at a narrow contact surface on the circumference of the rotating shaft or contact can be made over a broader area as shown in FIG. I where the flexible sealing ring contacts the shaft 1 over a distance A. The low coefficient of friction of the fiber material results in low frictional heat. Because of this the extent to which the flexible sealing ring contacts the shaft can be increased. This permits a better seal of the fluid medium. This low frictional heat is due to the wide contact surface between fibers, oil, and shaft where, during operations, the rise in temperature at the contact surface is markedly lower than encountered in the use of known elastomeric seals. The bigger sealing surface permits slight defects of the surface respectively and allows for greater tolerances of manufacture of the shaft.

Due to the pore-containing structure of the fiber material, one can apply additional lubricants, such as grease materials, graphite or the like. This insures an excellent lubrication against dry operation. It also provides an additional securement of the static seal to the shaft. The filling lubricant, i.e., grease, will therefore not represent an obstacle against the mobility of the fibers. Dry operations are also permitted even in the presence of non-lubricating media as, for instance, water as even in the presence of such non-lubricating media the necessary density can be maintained over long periods of time.

According to its structure, the sealing ring is especially suited for use as a shaft sealing ring in fast rotating machines. With the corresponding construction, the sealing ring can also abut axially with its lip. Thus, the shaft can rotate and the sealing assembly can be maintained static. On the other hand, the operations can be performed by rotating the sealing assembly about a static shaft. In fact, operations can be conducted by rotating the shaft in one direction and the sealing assembly in another. The sealing ring can either be fastened to the case itself or to the shaft. Means are generally provided to urge the sealing ring into contact with the shaft.

In many instances, it is suitable to press the sealing surface with the aid of a spring against the shaft and respectively against the machine part which is to be sealed. Satisfactory results are obtained, for example, by the use of a foam material spring made of a synethetic foam such as polystyrene foam, polyester foam or other suitable synthetic foam, e.g., foams made of a phenol or formaldehyde of these foams or provides the required elasticity in addition to having the required aging resistance to permit the sealing assembly to have an extended lifetime. Foamed material springs are suited to shape the distribution of contact forces in the axial direction according to requirements of the machine.

It should be understood that the contact pressure of the sealing surface can, with good success, be beneficially affected by means of a metal or a mineral fiber non-woven fabric. In this case, an excellent and constant restorative force is obtained. The metal or mineral fiber non-woven fabric is utilized as a continuous layer against the sealing. Of course, an appropriate contact pressure must be employed so that the sealing ring is properly disposed against the shaft. In many cases a simple garter spring or blade spring can be employed to dispose the sealing ring against the shaft. A meander-shaped bent steel band or even a bent steel wire will be sufficient to dispose the sealing ring against the shaft with the proper contact pressure.

It will be realized that numerous different types of fabric are useful for the flexible sealing ring and these include woven and non-woven materials. The free-fiber ends can be provided by using a commercially available non-woven material or they can be provided by a careful cutting process of a woven material. A web of free fiber ends can suitably be provided by a flocking technique wherein a non-woven fabric is flocked additionally with mobile fibers. There is also contemplated foils, rubber, elastomeric materials, molding materials and other shaped objects which are flocked with mobile fibers on the surface thereof to be contact with the shaft. In fact, the sealing surface need be fibrous only to the extent that there are free mobile fibers on the surface which is contact with the shaft.

Because of the necessary restorative capacity of the fibers, synthetic fibers have proven to be especially suited. However, natural fibers can also be employed so long as they show the desired mobility and restorative properties. In this connection one can utilize metal fibers, mineral fibers such as asbestos fibers, carbon fibers or mixtures of these with synthetic fibers.

If the sealing ring is to be laminated with another material on the side which is to be sealed, the sealing lip will also consist of at least two layers. When the sealing lip comprising the layer having the free fiber ends, the mating layer, and the layer which is treated to retain the fluid media is disposed within the housing of the sealing assembly, the mating layer can be brought around to be disposed over the contact surface in order to assure a proper engagement of the sealing lip or ring against the shaft even in the case of a stationary shaft. If necessary the sealing lip can be treated with a greasy substance or graphite in an appropriate manner. In order to achieve an improved statical sealing, the sealing lip can be cut, for example, at an incline.

The layer of the sealing ring in contact with with fluid medium, the contact surface, is usually provided with an impregnate or a coating composition to restrain the fluid medium from migrating through the fabric. This coating can be dispensed with if the layer itself is provided with a surface which is composed of closed pores or pores which are of such a size that they will not appreciably absorb the fluid medium or when they absorb the same and equilibrium will be set up whereby further migration of the fluid medium through the material is substantially precluded. The section of pores on the surface facing the fluid medium can be adjusted so that the medium to be sealed does not penetrate through the sealing lip owing to surface tension.

When there is experienced an increase in pressure from the medium side of the sealing ring, the side disposed away from the medium, the mating surface, can also be provided with a material which condenses the structure so as to further seal the fluid medium within the housing. Normally the mating surface is then contacted with a condensing composition which has good lubricity properties so as to permit the desired amount of lubrication at the point where the sealing ring is in contact with the shaft. Good lubrication or good freedom of rotation should be preserved at the points where the shaft may contact with the mating surface. However, it is absolutely necessary that the mating surface maintain the free fiber ends in a mobile condition so that they can assume the orientation described above. Thus, treatment of the mating surface with condensation materials must be done so as not to adversely affect the mobility of the free fiber ends. The free fiber ends must be allowed to adjust their disposition in accordance with the shafts direction of rotation. However, it is suitable that the mating material is a material which is robust in case of dry operation as for instance polytetrafluoroethylene.

The use of the sealing ring allows for a simplicity of construction and a greater tolerance in the manufacture of the shaft and related parts. The sealing ring makes few demands on the nature of the surface of the contacting counter-part in the area of the contact. Thus, by use of the novel sealing ring, the sealing apparatus is characterized by low cost in manufacture compared with traditional elastomeric sealing rings.

The disposition of the sealing rings within a sealing assembly is illustrated in the accompanying drawings. Referring to FIG. I a sealing ring 3 is disposed about a shaft 1 and is in contact with a relatively broad area of the shaft defined by line A, it being realized that an area around the circumference of shaft A is in contact with this sealing ring when the sealing ring surrounds the shaft. There is provided a case 2 which operates as a housing for a fluid medium disposed generally between the outer casing wall disposed in facing relationship to the shaft 1 and a layer of the sealing ring. A spring 4 is provided which consists of a metal nonwoven fabric. This spring provides the necessary contact pressure against the sealing lip 3 thereby insuring the proper contact pressure of the sealing ring 3 against the shaft 1. A coating 5 can be disposed over the spring 4 so as to inhibit medium diffusion through the sealing lip.

Referring to FIG. II another embodiment is shown wherein another seal is disposed in sealing contact with a shaft. Here, the sealing lip 3 is inserted about the shaft by means of a clamping ring 7 disposed within case 6. The sealing lip 3 on its mating surface engages shaft 1 over a line A. The sealing lip 3 is sealed by means of a covering layer in the same manner as in FIG. I with the exception that no spring 4 is employed. The spring 4 in FIG. I and the clamping ring 7 comprise means for urging the sealing ring to be in contact with the shaft 1.

Referring to FIG. III there is shown still another embodiment of the invention wherein sealing lip 3 engages the shaft 1 in the same manner as in FIGS. I and II. Here, the sealing lip 3 is provided with a condensed layer 5 in facing relationship with the medium. The sealing lip 3 abuts the case 17 and is urged into abutting relationship by means of clamping ring 9. Clamping ring 9 is responsive to a holding ring 8 which provides the necessary tensional force against spring 10, shown in cross section, which engages the covering layer 5 and serves to hold the sealing ring against shaft 1. In this FIG. III there is thus provided two means for urging the flexible sealing ring into contact with the shaft 1.

Referring to FIG. IV there is shown still another embodiment of the seal of the invention whereby the sealing lip 3 is provided with a sliding material 11 which has a sealing function. There is also provided a spring 14 disposed along the surface of the sealing ring 3 which spring urges the lip 3 toward the shaft 1. A clamping ring 27 is employed to insure that the flexible sealing ring 3 and spring 14 are maintained in a generally stationary manner against the housing 16.

Referring to FIG. V there is shown a seal in section being clamped tightly against a shaft 1 by means of a clamping ring 12. The sealing lip 3 abuts against line A of the case 13. The side facing the medium is condensed with a material which inhibits migration of the fluid medium into the sealing lip 3.

Referring to FIG. VI there is shown still another embodiment in which the sealing lip 3 abuts shaft 1 along line A and is held against shaft 1 by means of a foam material spring 14. The foam material spring 14 provides the necessary contact pressure for proper engagement of the sealing ring 3 against the housing or case 32 and the shaft 1. By disposing the foam material 14 over the contact surface of the sealing lip 3 the medium is prevented from migrating towards the shaft 1 when rotation of shaft 1 ceases.

What is claimed is:

1. In a sealing assembly for a shaft comprising a housing for a fluid medium, a flexible sealing ring disposed within said housing and adaptable to be disposed about a shaft in contact therewith, and means for urging said flexible sealing ring into contact with said shaft, the improvement wherein said flexible sealing ring comprises a layer which is impermeable to the fluid medium to be used, said layer in facing relationship to the interior of said housing, said flexible sealing ring having on its exterior surface which is in contact with the shaft free fiber ends, a majority of which are oriented in an axial direction towards the interior of said housing and are disposable in the direction of rotation of the shaft.

2. A sealing assembly according to claim 1 wherein said flexible sealing ring is provided with a sealing lip.

3. A sealing assembly according to claim 1 wherein the sealing ring abuts axially with its lip.

4. A sealing assembly according to claim 1 wherein the sealing ring abuts radially with its lip.

5. A sealing assembly according to claim 1 wherein the sealing lip consists of at least two layers.

6. A sealing assembly according to claim 1 wherein said free fiber ends are flocked on said sealing ring.

7. A sealing assembly according to claim 1 wherein said sealing lip is cut inclined in the range of the contact surface with the shaft so that the sealing layer touches the contact surface.

8. A sealing assembly according to claim 1 wherein the layer facing the interior of said housing is provided with a condensed structure which layer is pulled around the front surface of the sealing lip.

9. A sealing assembly according to claim 1 wherein said flexible sealing ring comprises a non-woven material.

10. A sealing assembly according to claim 1 wherein said flexible sealing ring comprises a sealing lip of a web having free mobile fiber ends.

11. A sealing assembly according to claim 1 wherein said free fiber ends possess a high, constant restoring force.

12. A sealing assembly according to claim 1 wherein said means for urging said sealing ring in contact with said shaft comprises a foam material spring.

13. A sealing assembly according to claim 12 wherein said foam material spring comprises a synthetic foam.

14. A sealing assembly according to claim 1 wherein said synthetic foam is selected from the group consisting of polyurethane foam, polyester foam and polyethylene foam.

15. A sealing assembly according to claim 14 wherein said means for urging said flexible sealing ring towards said shaft comprises a metal fiber non-woven fabric or a mineral fiber non-woven fabric.

16. A sealing assembly according to claim 1 wherein the metal or mineral fiber non-woven fabric is worked into said flexible sealing ring.

17. A sealing assembly according to claim 1 wherein said means for urging said flexible sealing ring toward the shaft comprises a garter spring or a blade spring.

18. A sealing assembly according to claim 1 wherein said means for urging said flexible sealing tile into contact with said shaft comprises a spring element of meander-shaped like bent steel wire or steel band.

19. A sealing assembly according to claim 1 wherein the flexible sealing ring is, at least in the region proximate the sealing lip on the side facing the interior of said housing, coated or laminated.

20. A sealing assembly comprising a housing, a flexible sealing ring disposed within said housing, means for urging said flexible sealing ring toward a shaft about which the said sealing assembly is connectable wherein said flexible sealing ring comprises a fiber-containing material, which is provided on the side opposite the interior of said casing with a material which is impermeable to a fluid medium, and robust in case of dry operation said side opposite that to which faces the fluid medium having free fiber ends in the region wherein said sealing ring would make contact with a shaft disposed therewithin, the proponderant majority of said free fiber ends being orientable in an axial direction towards the medium to be sealed, said free fiber ends being disposable in the direction of shaft rotation.

21. A sealing assembly according to claim 20 wherein the surface of the material disposed away from the interior of said housing bears an impermeable coating comprising a polytetrafluoroethylene coating material.

22. A sealing assembly according to claim 1 wherein said flexible sealing ring contains, at least in the region wherein it is in contact with a shaft, a lubricant or lubricity additive which fills at least a portion of the pores of the fiber containing flexible sealing ring, whereby the same has improved lubrication properties.

23. A sealing assembly according to claim 22 wherein said flexible sealing ring comprises a non-woven fabric which contains coarse and fine fibers in which the fine fibers are at least partially removed in the range of the sealing lip.

24. A sealing assembly according to claim 23 wherein the cross section of the pores of the fiber-containing material is small enough to retain the medium to be sealed, whereby in the front range of the contact surface the fiber structure is loosened up, e.g. by means of partially removing the fibers.

* * * * *